Aug. 17, 1965     W. L. MORRISON     3,201,322
NUCLEAR REACTOR FUEL ELEMENT FOR NITROGEN FIXATION
Filed Feb. 13, 1958                    2 Sheets-Sheet 1
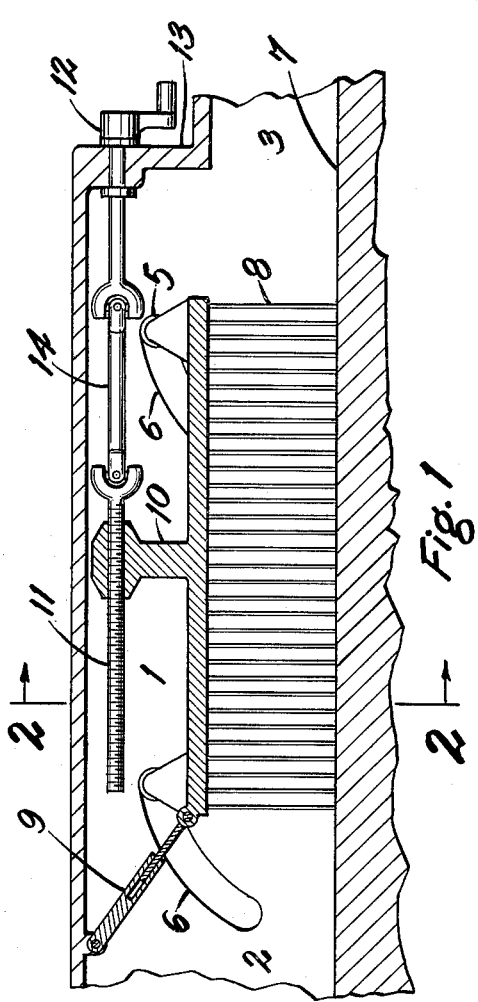
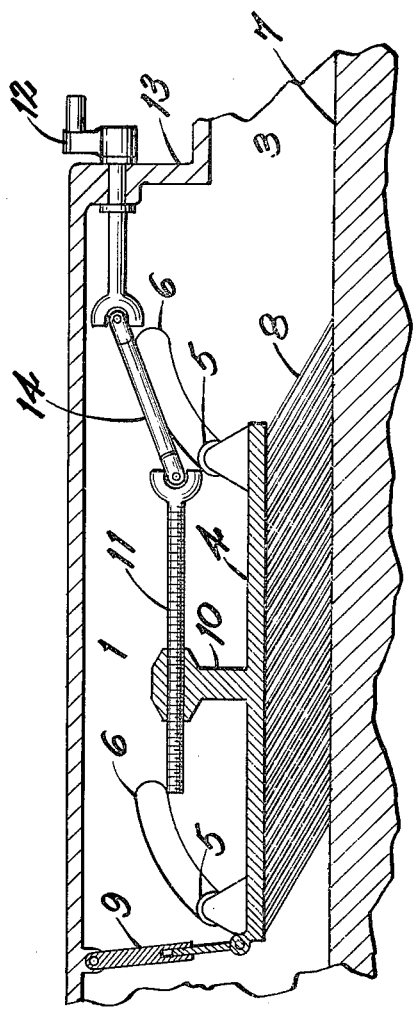
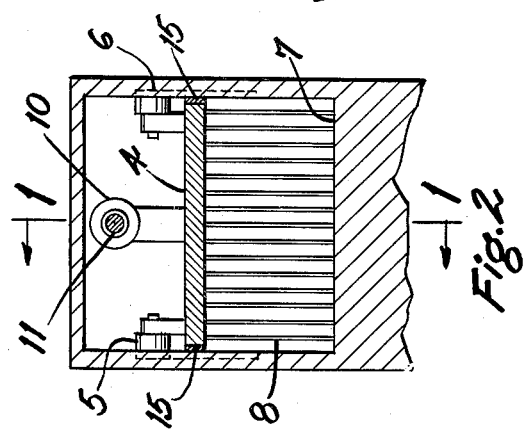
INVENTOR.
WILLARD L. MORRISON
BY PARKER & CARTER
ATTORNEYS

United States Patent Office 3,201,322
Patented Aug. 17, 1965

3,201,322
NUCLEAR REACTOR FUEL ELEMENT FOR NITROGEN FIXATION
Willard L. Morrison, Lake Forest, Ill., assignor to The Union Stock Yard and Transit Company of Chicago, Chicago, Ill., a corporation of Illinois
Filed Feb. 13, 1958, Ser. No. 715,001
2 Claims. (Cl. 176—66)

My invention relates to improvements in fuel elements for reaction chamber and has for one object to provide a fuel element wherein a multiplicity of thin, glass fibers enriched with fissionable matter may be so adjustably supported that the clearance between adjacent fibers may be accurately controlled, varied and adjusted.

Another object of my invention is to provide in a reaction chamber, a passage for the flow of a fluid element wherein the cross sectional area of the passage may be conveniently adjusted and changed and the clearance between the fuel or other reactive bodies exposed to the fluid may also be changed and adjusted.

I propose a chamber comprising two parallel relatively rigid walls, the space between them will be occupied by a multiplicity of fibers attached at their ends only to the opposite walls, the fibers being generally parallel with one another, the walls being so supported that they may move longitudinally with respect to one another and also approach to and from one another so that when relative longitudinal movement takes place with the walls approaching toward and from one another, the fibers while maintaining parallelism with one another may be at one end of the excursion perpendicular to the walls and may also assume a variable inclination with respect to the walls so that the distance between the fibers may be controlled and as a result the density of the fibrous filler will vary but will be uniform throughout the entire treatment area.

Such a structure may be used as a filter or as a reagent chamber. When used as a filter, the fibers will serve as the filtering means to trap solids in the fluid passing through the chamber. When used as a reagent chamber the fibers may have incorporated with them the element which brings about the reaction. For instance, the fibers may serve as a catalyst or the fibers may trap and hold the reagent.

When my invention is, for example, used for the fixation of nitrogen from air by reactor radiation, the reaction chamber will contain a multiplicity of straight, generally parallel, synthetic inorganic fibers, for example glass fibers which contain fissionable material, for example—Uranium 233 or 235 or Plutonium 239—though other fissionable material can be incorporated in or carried by the fibers.

The control of the reaction depends, as is well known, on the spacing of the fibers and I propose to control the distance between them with micrometric accuracy by supporting the fibers to extend across the chamber in straight lines between two opposed walls. The fibers lacking structural strength, in compression, will be held under such tension as to be straight and parallel to one another. The distances between the fibers will be adjusted by imparting relative lateral movement to the supporting walls. One wall may move toward and from the other along an arcuate path, the radius of which equals the length of the fibers. When the filaments are perpendicular to the chamber walls, the distance between adjacent fibers will be a maximum. As the walls are relatively displaced, the clearances between the fibers will decrease down to the point at which they may actually come in contact with one another.

A structure of apparatus such as I propose may be useful for other purposes. The fibers instead of carrying fissionable material might be of metal or other material which could act as a catalyst. The multiplicity of fibers between the two opposed walls of a chamber might serve as a filter or screen.

My invention is illustrated more or less diagrammatically in the accompanying drawings, wherein FIGURE 1 is a diagrammatic longitudinal section through a reaction chamber;

FIGURE is a section along the line 2—2 of FIGURE 1;

FIGURE 3 is a section similar to FIGURE 1 showing the parts in a different position;

Like parts are indicated by like characters throughout the drawings and specification.

Figure 4:
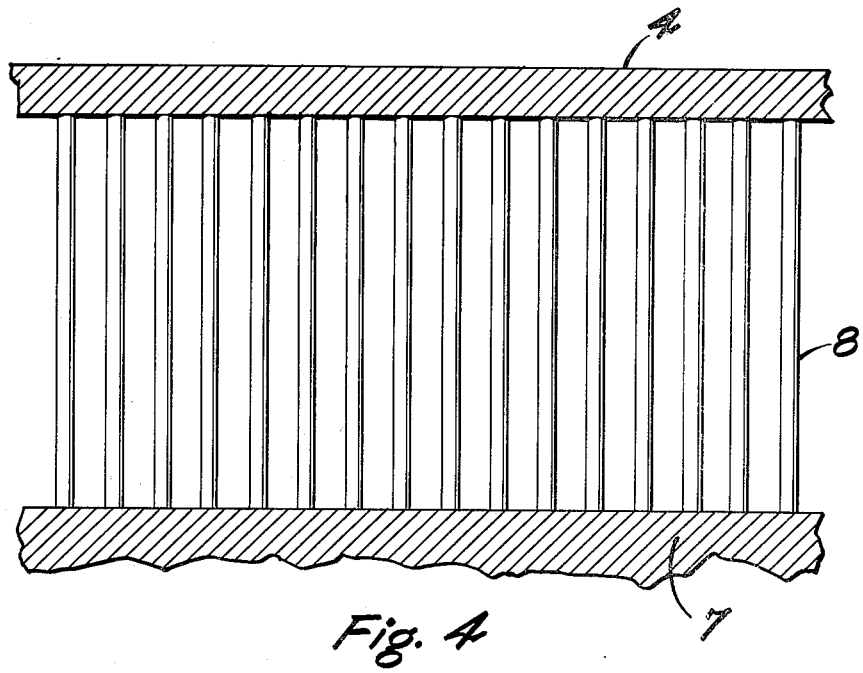
FIGURE 4 is a diagrammatic section on an enlarged scale with the parts in the position shown in FIGURE 1.

The chamber 1 is provided with an intake passage 2 and a discharge passage 3. The cross sectional area of the two passages are substantially the same and less than the cross sectional area of the chamber 1. A floating wall 4 has secured thereto a cam element 5 which rides in cam slots 6. Extending across the space between the wall 4 and the floor 7 are a multiplicity of uniformly distributed, equally spaced fibers or filaments 8. The fibers are attached at their opposite ends respectively to the floor 7 and to the movable wall 4 by any suitable means which form no part of the invention and are not illustrated. When the wall 4 is in its uppermost position, the fibers 8 are perpendicular to the wall 4 and floor 7 and are most widely spaced apart, being in parallelism and out of contact with one another.

A sliding baffle 9 is pivoted along its lower edge to the upstream side of the wall 4 and along its upper edge to the upper wall of the chamber 1. An interiorly threaded finger 10 projects above the wall 4. Threaded in it is a feed screw 11. An adjusting crank 12 is rotatably mounted in the end wall 13 of the chamber 1 and is connected to the feed screw 11 by the universal joint mechanism 14 as illustrated.

The floor 7 extends clear across the chamber 1 and is in sliding sealing contact with the opposite walls of the chamber as at 15.

The cam slots 6 are so disposed that as the crank 12 is rotated to move the wall 4 from the position shown in FIGURE 1 to the position shown in FIGURE 3, the wall is laterally displaced and approaches the floor 7, the contour of the cam being such that fibers 8 are maintained in sufficient tension to keep them straight and parallel in all positions.

Figure 5:
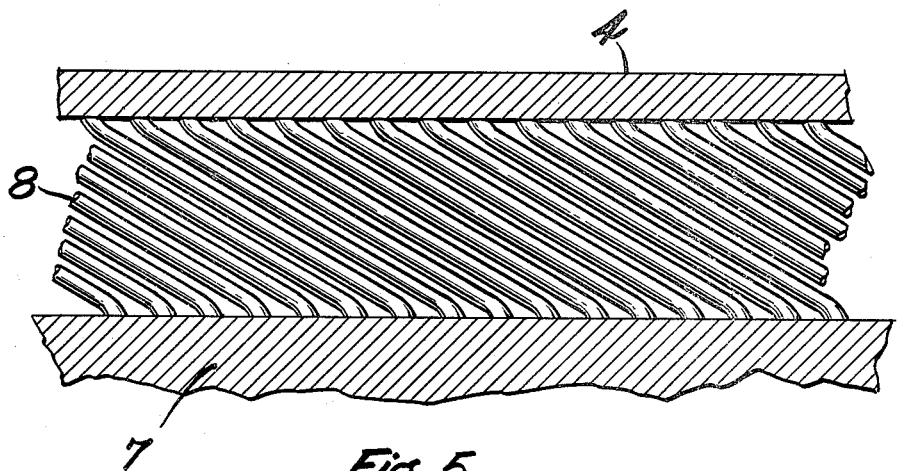
FIGURE 5 is a section similar to FIGURE 4 with the parts shown in the position of FIGURE 3.

In the large scale FIGURE 4, the fibers 8 are perpendicular to wall 4 and floor 7 and are equally spaced from end to end. In FIGURE 5, corresponding to FIGURE 3, the wall 4 has been laterally displaced and the fibers are inclined, tending to approach one another. The greater the inclination of the fibers, the less the clearance between them.

Since the reactor in which my chamber would be located forms no part of the invention, it is not illustrated. The pressures and temperatures would, of course, be very great but the differential pressure between the upstream and downstream ends of the reaction chamber needing to be only sufficient to insure flow of gas therethrough would be so slight that the sliding seal at 15 and the sliding baffle at 9 will be entirely adequate to guide the gas through the reaction chamber.

The method of attachment of the fibers to the surfaces 4 and 7 form no part of my invention. I have shown them diagrammatically just as could well be the case if the fibers were fused at both ends to opposite surfaces. I have exaggerated the curvature of the fibers as the elements are moved laterally, merely to indicate that some stress on these fibers—a stress which they are entirely adequate to handle—would take place.

I claim:

1. A nuclear reactor fuel element comprising a chamber having an intake passage at one end portion and a discharge passage at the other end portion for the passage of fluid material to be reacted therethrough from the intake passage to the discharge passage, walls spaced one from the other crosswise within the chamber, a plurality of glass fibers enriched with fissionable material secured at their opposite ends to the spaced walls to extend crosswise of the chamber in spaced parallel relationship whereby the fibers extend substantially crosswise to the flow of the material through the chamber and out of contact one with another whereby the fibers are maintained out of contact one with the other for uniform flow of the material therebetween and means mounting the walls for movement laterally relative to each other and in a direction towards and away from each other for varying the spaced relationship between the fibers while still maintaining the fibers in spaced parallel relation.

2. A nuclear reactor fuel element comprising a chamber having an intake passage at one end portion and a discharge passage at the other end portion for the passage of fluid material to be reacted therethrough from the intake passage to the discharge passage, walls spaced one from the other crosswise within the chamber, a plurality of glass fibers enriched with fissionable material secured at their opposite ends to the spaced walls to extend crosswise of the chamber in spaced parallel relationship whereby the fibers extend substantially crosswise to the flow of the material through the chamber and out of contact one with another and in which the fibers are mounted in tensioned relationship between the walls whereby the fibers are maintained out of contact one with the other for uniform flow of material therebetween and in which one wall is shiftable relative to the other wall about an arc having opposite attached ends of the fibers as the center.

References Cited by the Examiner

UNITED STATES PATENTS

| 1,961,493 | 6/34 | Hillis | 204—154 |
| 2,153,075 | 4/39 | Copeland | 20—62 |
| 2,714,577 | 8/55 | Fermi et al. | 176—44 |
| 2,761,185 | 9/56 | Sherwood | 20—62 |
| 2,898,277 | 8/59 | Harteck et al. | 176—39 |
| 2,920,025 | 1/60 | Anderson | 176—65 |
| 2,928,780 | 3/60 | Harteck et al. | 176—10 |
| 2,981,672 | 4/61 | Kingston | 176—82 |

FOREIGN PATENTS 614,386   5/48   Great Britain.

OTHER REFERENCES

Harteck et al.: "Nucleonics," vol. 15, August 1957, pages 94–98.

Harteck et al.: "Nucleonics," vol. 14, No. 7, July 1956, pages 22–25.

NAA–SR–1936, Atomics International, January–March 1957, pages 17–21.

CARL D. QUARFORTH, *Primary Examiner.*

ROGER L. CAMPBELL, LEON D. ROSDOL, WILLIAM G. WILES, *Examiners.*